US012521685B2

(12) United States Patent
De Franceschi et al.

(10) Patent No.: US 12,521,685 B2
(45) Date of Patent: Jan. 13, 2026

(54) DEVICE FOR INJECTING FLUID INTO A LIQUID, METHOD FOR CLEANING SAID DEVICE, AND EFFLUENT TREATMENT INSTALLATION (71) Applicant: VIGIE GROUPE, Paris (FR)

(72) Inventors: Laurent De Franceschi, Cernay (FR); Luca Ramoino, Uster (CH); Walter Uttinger, Winterthur (CH); Gilles Carrand, Sartrouville (FR)

(73) Assignee: Vigie Groupe, Paris (FR)

( * ) Notice: Subject to any disclaimer, the term of this patent is extended or adjusted under 35 U.S.C. 154(b) by 1044 days.

(21) Appl. No.: 17/413,931

(22) PCT Filed: Dec. 11, 2019

(86) PCT No.: PCT/EP2019/084570
§ 371 (c)(1),
(2) Date: Jun. 14, 2021

(87) PCT Pub. No.: WO2020/120536
PCT Pub. Date: Jun. 18, 2020

(65) Prior Publication Data
US 2022/0080371 A1 Mar. 17, 2022

(30) Foreign Application Priority Data
Dec. 12, 2018 (FR) ..................................... 1872757

(51) Int. Cl.
*B01F 25/30* (2022.01)
*B01F 23/232* (2022.01)
(Continued)

(52) U.S. Cl.
CPC .......... *B01F 25/305* (2022.01); *B01F 23/232* (2022.01); *B01F 23/451* (2022.01);
(Continued)

(58) Field of Classification Search
CPC .... B01F 23/232; B01F 23/451; B01F 25/305; B01F 35/13; B01F 35/2113; B01F 2101/305; C02F 3/1284; C02F 2303/14
(Continued)

(56) References Cited

U.S. PATENT DOCUMENTS 543,411 A * 7/1895 Taylor ...................... F04F 5/08
55/463
2,883,169 A * 4/1959 Daman .................. B03D 1/028
261/77
(Continued)

FOREIGN PATENT DOCUMENTS

CH 608861 A5 * 1/1979
CN 102065970 A 5/2011
(Continued)

OTHER PUBLICATIONS

Machine translation of WO-2008025680-A1, pp. 1-3. (Year: 2008).*
(Continued)

*Primary Examiner* — Charles S Bushey
(74) *Attorney, Agent, or Firm* — BakerHostetler (57) ABSTRACT

A device for injecting a secondary fluid into a main liquid, includes a first part able to convey a secondary fluid in a substantially longitudinal direction; a second part able to eject the secondary fluid from the device, so as to inject the secondary fluid into a main liquid, the second part being in fluidic connection with the first part and including an open end; the device including at least a first position, referred to as the low position, and a second position, referred to as the high position, and further including a positioning system able to position the device in a position between the first position and the second position.

14 Claims, 5 Drawing Sheets

(51) Int. Cl.
  *B01F 23/451* (2022.01)
  *B01F 35/13* (2022.01)
  *B01F 35/21* (2022.01)
  *C02F 3/12* (2023.01)
  *B01F 101/00* (2022.01)

(52) U.S. Cl.
  CPC .......... *B01F 35/13* (2022.01); *B01F 35/2113* (2022.01); *C02F 3/1284* (2013.01); *B01F 2101/305* (2022.01); *C02F 2303/14* (2013.01)

(58) Field of Classification Search
  USPC ........................................ 261/77, 121.1, 123
  See application file for complete search history.

(56) References Cited

U.S. PATENT DOCUMENTS

| | | | | |
|---|---|---|---|---|
| 2,996,287 | A * | 8/1961 | Audran | B01F 27/81 |
| | | | | 261/87 |
| 3,946,948 | A * | 3/1976 | Horlin | B01F 25/305 |
| | | | | 239/453 |
| 4,172,009 | A * | 10/1979 | Simon | G21C 9/012 |
| | | | | 976/DIG. 142 |
| 4,210,613 | A * | 7/1980 | Webb | C02F 3/223 |
| | | | | 210/220 |
| 4,282,172 | A * | 8/1981 | McKnight | B01F 23/23231 |
| | | | | 210/220 |
| 4,477,341 | A * | 10/1984 | Schweiss | B03D 1/1406 |
| | | | | 261/DIG. 75 |
| 4,534,862 | A * | 8/1985 | Zlokarnik | B03D 1/1462 |
| | | | | 261/DIG. 75 |
| 5,023,021 | A | 6/1991 | Conrad | |
| 5,154,112 | A * | 10/1992 | Wettern | B01F 23/2361 |
| | | | | 99/323.1 |
| 5,520,714 | A * | 5/1996 | Muschelknautz | F23G 7/085 |
| | | | | 96/349 |
| 6,460,830 | B1 * | 10/2002 | Boulant | B01F 23/231 |
| | | | | 261/36.1 |

FOREIGN PATENT DOCUMENTS

| | | | | |
|---|---|---|---|---|
| CN | 103977603 A | | 8/2014 | |
| DE | 689083 C | | 3/1940 | |
| DE | 4309918 A1 | * | 8/1993 | |
| DE | 19950600 A1 | * | 5/2001 | |
| DE | 10 2009 010 698 A1 | | 9/2010 | |
| KR | 10-2005-0003951 | * | 1/2005 | |
| WO | WO-2008025680 A1 | * | 3/2008 | .......... B03D 1/1412 |
| WO | 2017/202681 A1 | | 11/2017 | |

OTHER PUBLICATIONS

English Translation of CH 608861 A5 (Year: 1979).*
English Translation of DE 4309918 A1 (Year: 1993).*
English Translation of DE 19950600 A1 (Year: 2001).*
English Translation of KR 20050003951 A (Year: 2005).*
First Chinese Office Action issued in Chinese Patent Application No. 201980087401.6 dated Dec. 30, 2022, with English translation.

* cited by examiner

FIG.1A

PRIOR ART

FIG.1B

PRIOR ART

DEVICE FOR INJECTING FLUID INTO A LIQUID, METHOD FOR CLEANING SAID DEVICE, AND EFFLUENT TREATMENT INSTALLATION

CROSS-REFERENCE TO RELATED APPLICATIONS

This application is a National Stage of International patent application PCT/EP2019/084570, filed on Dec. 11, 2019, which claims priority to foreign French patent application No. FR 1872757, filed on Dec. 12, 2018, the disclosures of which are incorporated by reference in their entirety.

FIELD OF THE INVENTION

The invention relates to a device able to inject a fluid into a liquid.

Such an injection device, which in certain cases may be referred to as a "diffuser", is particularly suitable for installations dedicated to the treatment of aqueous effluents, particularly the treatment of aqueous effluents containing sludge, and/or to installations and methods employing sludge to treat aqueous effluents.

BACKGROUND

The invention relates to the field of water treatment and more particularly to the installations and methods for treating waste water, also referred to as "raw water". The present description will also make mention of "aqueous effluents".

The invention relates in particular to the treatment of aqueous effluents containing activated sludge and/or to installations and methods employing activated sludge to treat aqueous effluents. In the present description, "sludge" will also be used to refer to the "activated sludge".

A treatment installation is made up of at least one "reactor" or "main reactor" in which the sludge is kept in suspension and aerated in order to treat the waste water. In certain applications, the term used is rather "tank", "main tank", or else "aeration tank".

A treatment installation furthermore generally comprises solid-liquid separation means which may comprise a secondary settling tank, a clarifier, a membrane or any other means allowing solid-liquid separation. When the separation means comprises a membrane, this membrane may be situated in the main reactor (or in the main tank) or outside the main reactor or tank (for example in a filter body or in a tank dedicated to filtration, etc.). In general, several membranes are used, for example in the form of one or more membrane modules.

In a method of the SBR type, the solid-liquid separation is carried out in the main reactor or tank.

A treatment installation finally comprises means for recirculating the sludge to the reactor or tank.

A reactor or tank specifically used with activated sludge may be of one of the following types:
- a conventional aeration tank (nonsequential, without a membrane in the tank) connected downstream to separation means, generally a clarifier;
- a sequential biological reactor, better known by the name of "sequencing batch reactor" (SBR) incorporating solid-liquid separation means;
- a membrane reactor or membrane bioreactor, better known as a Membrane BioReactor (MBR).

A treatment installation needs to comprise means so that the effluent that is to be treated is brought into contact with a fluid that contributes to the treatment of said effluent. These means may be situated inside the reactor or tank, or upstream of said reactor or tank. The fluid may be a gas, a liquid, a mixture of fluids, or a fluid-solid mixture.

In other words, for optimal treatment of aqueous effluents it is important to have access to means able to:
- mix at least one reagent (liquid, dispersed-solid/liquid mixture, dissolved-gas/liquid mixture) into a liquid, and/or
- dissolve and/or diffuse a gas into a liquid.

The reagent may for example be hydrogen peroxide, permanganate, peracetic acid, or any other liquid or gaseous mineral or organic compound.

The gas may be air, oxygen, ozonized or chlorinated gases, for example chlorine, chlorine dioxide, or else ozone.

The liquid may be an effluent that is to be treated, for example water that is to be treated, and/or a mixed liquor of biological sludge.

The liquid may be a functional liquid (namely a liquid carrying at least one reagent and/or at least one gas able to contribute to the treatment of an aqueous effluent). The functional liquid is then mixed with the effluent that is to be treated.

The mixing and/or the diffusing/dissolving may take place directly in contact with the effluent that is to be treated and/or indirectly via a functional liquid which is subsequently mixed with the effluent that is to be treated.

The devices able to perform liquid/liquid mixing comprise, for example, dynamic mixers, of the type allowing mechanical or else hydraulic or electromagnetic agitation. For example, a mixer having a mixing blade with a high rotational speed may be installed inside a reactor.

One disadvantage of dynamic mixers is that they require mechanical equipment provided with rotating parts, and that they therefore require a not-insignificant supply of energy, as well as maintenance on said equipment.

Furthermore, they are not generally best suited to dissolving/diffusing a gas in a liquid.

Devices able to perform liquid/liquid mixing also comprise static mixers. Such mixers may be installed in piping in order to perform in-line mixing upstream of the reactor. These may, for example, be a:
- simple mixer, made up of an injection lance and generally of an orifice plate at the outlet of the injection lance, allowing the injection of readily mixable reagents: one disadvantage with such a device is that the mixing needs to be performed over a long length, equivalent to 50 to 100 times the diameter of the piping depending on the embodiment;
- mixer with packing, the packing generally being made up of fins, vanes, or blades with reversed pitch, such a mixer allowing the injection of mineral reagents and polymers into concentrated solutions of which the flow rate may represent just 0.01% of the flow rate of raw water (water to be treated), mixing is complete at the outlet of the mixer after a distance representing 2 to 6 times the diameter of the piping: one disadvantage with such a device is that it generates a head loss generally comprised between 1 and 5 mWC, thus limiting its use to low flow rates of concentrated solution in comparison with the flow rate of raw water. Such a device also easily becomes clogged with fibers and/or various deposits;
- hydraulic radial diffusion mixer, consisting of a nozzle centered on the axis of the piping and of an orifice plate with a peripheral opening, allowing the injection of minimal reagents and polymers, mixing being performed completely over a length inferior to the diameter of the piping: one disadvantage with such a mixer is that it is mainly suited to water, because it allows the injection of concentrated solutions only for very low flow rates (up to 0.0005% of the flow rate of raw water);

cyclone-type mixer, better suited to the conditioning of sludge and which comprises a cylindrical part with inlets for sludge and for reagents, and a conical part in which the rotary motion allows mixing to be completed, the cylindrical part comprising two adjustable deflectors. If suspended matter is present, this device may be sensitive to abrasion.

As an alternative to piping for performing in-line mixing upstream of the reactor, the static mixers may be installed in an open channel in order to perform in-line mixing.

These may be a static mixer of the injector type, comprising an injection lance or a grating, using pressurized dilution water at a flow rate representing 2 to 10% of the flow rate of raw water; the dilution water intended to create the outlet velocity during the diffusion of the reagent is mixed with the reagent a few meters before entering the water treatment device: such a mixer allows the injection of concentrated solutions, complete mixing being achieved in 10 to 20 seconds, but a disadvantage is the head loss which may reach as much as 1 to 10 mWC.

It may also be a mixer of the hydroejector type, using a pressurized fluid combined with the venturi effect.

One major disadvantage with static mixers (apart from the cyclone mixer) is that they induce a loss of hydraulic head, and consequently a loss of energy, and that they are highly sensitive to blockages.

In order to avoid the head losses and blockage phenomena, units comprising a vortex generating device have been implemented, as in patent application WO2017202681. More specifically, this is a waste water treatment installation comprising at least a first biological treatment unit fed by a primary water channel upstream, and discharge from the first biological treatment unit is performed by a secondary water channel and a sludge channel downstream, which further comprises a second unit comprising a vortex generating device in fluidic communication with one or more of the channels. The installation also comprises an additional fluid supply circuit in communication with a channel and/or with the vortex generating device. The vortex generating device may be a well drop of substantially cylindrical shape. However, it emerges from the description and, in particular, from the examples, that the second unit comprising the vortex generating device is situated downstream of the treatment unit (and not upstream), being, for example, a sludge thickening or dewatering unit, a settling tank, a filtration unit, a contact and storage reservoir for disinfecting the secondary water downstream. The disadvantage of this is that the mixing efficiency may be lower, because it takes place in a secondary situation and therefore not necessarily at the point at which it will be the most beneficial.

The devices able to dissolve/diffuse a gas into a liquid are generally employed in a treatment installation that uses a gas to contribute to the treatment of the aqueous effluent, for example in an ozonization reactor. The device may, for example, be a:

porous diffuser, positioned at the base of the reactor and able to create bubbles of gas, the water that is to be treated circulating countercurrent to the gas (for example by admitting the water that is to be treated at the top of a column or of an ozonization chamber), the water head generally being comprised between 5 and 7 m above the diffusers: one disadvantage with such a device is the high head of water required and the risk of the pores becoming clogged;

U-tube, which comprises two vertical concentric tubes communicating at the bottom, the gas that is to be diffused, for example the ozonized gas, being entrained in and dispersed into the water that is to be treated which is injected by a high-speed pump as a downflow in the central tube, the water velocity and the increase in the pressure producing small-sized bubbles, the emulsion created then rising up in the annular part; the hydrostatic pressure head and the residence time of the gas bubbles are great because of the head of water, of the order of 20 meters, and the transfer of gas is thus encouraged: one disadvantage with such a system is the high head of water required and the presence of a pump, which entails a not-insignificant supply of energy as well as maintenance;

mixer with packing: the water that is to be treated is sprayed countercurrent to a gas, for example an ozonized gas; the packing contained within the body of the reactor has the task of distributing the liquid phase in the form of a film and of droplets throughout its flow under the effect of gravity; thus, the wetting of the elements of the packing develops the surface area for gas-liquid exchange: one disadvantage with such a device is the risk of clogging and the associated head loss;

radial diffuser of the type as described hereinabove, which may be combined with a hydroejector: the radial diffuser ejects a turbulent flow of ozonized gas/water which flow is created by the hydroejector;

hydroejector of the type described hereinabove, that may or may not be associated with a radial diffuser.

Of all the devices set out here, the radial diffuser is an effective, reliable and robust item of equipment which allows both liquid/liquid mixing and the dissolving/diffusing of a gas into a functional fluid followed by the mixing of this solution into a liquid, which is generally a different liquid than the functional fluid.

Figure 1A:
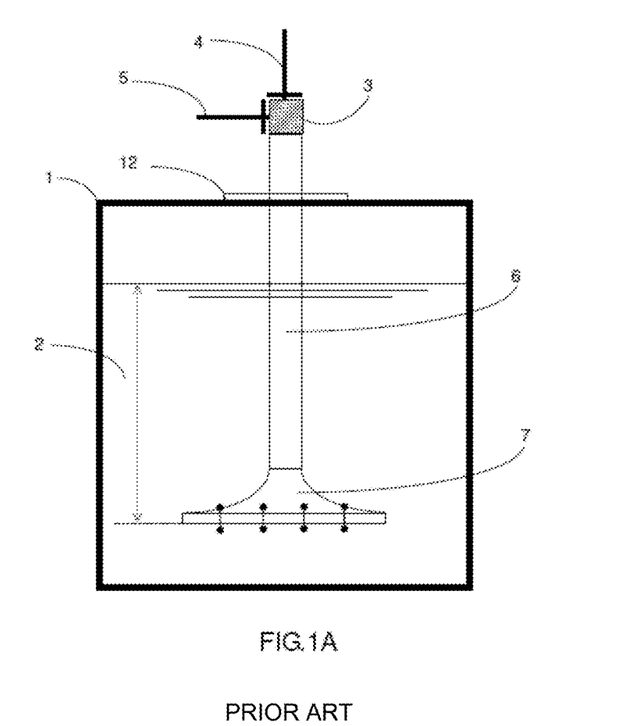

FIG. 1A illustrates an example of a radial diffuser submerged in a reactor 1 under a head of liquid 2. A system of seals 12 is situated at the point at which the diffuser enters the reactor. The diffuser comprises a mixing tube 3 fitted at its upper end with a functional-fluid inlet 4 and a gas inlet 5, and in its submerged lower part with a diffusion tube 6 equipped at its end with a diffusion cone 7 which ejects and distributes the functional fluid 4 and/or the gas 5 into the liquid 2.

In that case, the diffuser ejects into the reactor either a mixture of functional fluid and gas, or just the gas, or just the functional fluid.

Figure 1B:
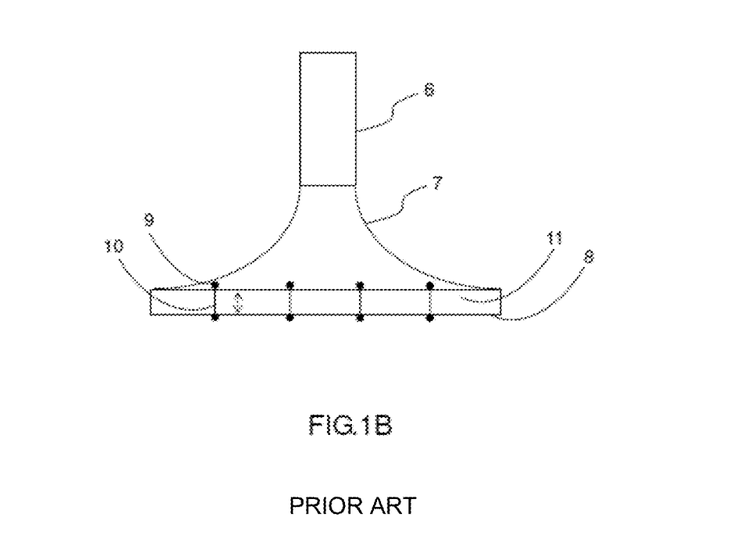

FIG. 1B illustrates the radial diffuser in detail. The diffusion cone 7 is fixed externally to a flat plate 8 by a series of bolts 9 fitted with spacers 10. The spacers ensure a constant passage section 11 for the gas 5 and/or the functional fluid 4 ejected into the liquid 2, this section being fixed by the length of the spacer 10.

The major advantage of the radial diffuser is the low head loss that it generates (generally less than 0.5 mWC), which is namely more than 2 to 20 times lower than that generated by static mixers (between 1 and 10 mWC) of hydroejector type. This amongst other things allows a reduction in the energy consumption during the dissolving, diffusing or mixing operations described above.

Another advantage of a radial diffuser is its flexibility of use. Specifically, it can be immersed in a reactor, or in piping connected upstream of a reactor.

When it is in a reactor, the diffusion cone may be oriented toward the surface of the liquid or toward the bottom of the reactor. Furthermore, the diffusion cone may be positioned against the bottom of the reactor or suspended freely in the reactor.

Hitherto, the radial diffuser, like most of the static devices set out hereinabove, has not been used in an environment containing a significant concentration of sludge. Rather, it is used for water with a very low solid matter concentration.

Specifically, when the functional fluid and/or the liquid that is to be treated has a high concentration of solid matter, such as suspended matter (which may be referred to in the present description as "SM") and/or fibrous waste, such as, for example, a mixed liquor of biological sludge (typically having suspended matter values in excess of 1 g/L, or fibrous waste values in excess of 20 mg/L), this matter becomes caught on and accumulates at the bolts and spacers. This has the effect over the course of time of reducing the passage section, or even ultimately of closing it completely, thereby increasing the head losses generated by the diffuser and therefore the energy consumption, and of reducing its efficiency.

Furthermore, in order to restore the diffuser performance, lengthy, laborious and costly cleaning operations are required, this in particular entailing:

halting the operation of the diffuser and, more widely, shutting down the treatment installation, cleaning the diffuser, which sometimes entails prior ventilation of the gas ceiling of the reactor, mobilizing a lifting device, and which requires cleaning and handling time.

Finally, these operations of restoring the performance of the diffuser can be performed only at discrete points in time and on a curative basis, namely only after having observed an increase in the head losses of the diffuser and/or a reduction in the technical performance thereof. Anticipating with such a diffuser is not possible.

Another disadvantage of the known diffuser is the progressive abrasion of the spacers and/or of the bolts, particularly when sand and, more generally, inorganic particulate matter is present, thus accelerating its aging.

The invention seeks to overcome the aforementioned disadvantages of the prior art.

What is sought is a device for injecting, and notably for radially diffusing, a fluid into a liquid which can be implemented not only with water but more specifically in the presence of a fluid with a higher concentration of solids, notably sludge, suspended matter, fibrous waste, and which is able to overcome the aforementioned disadvantages of the prior art.

What is sought is a device for injecting a fluid into a liquid the performance of which does not degrade, and which notably does not become blocked over the course of time, does not age prematurely, does not require painstaking lengthy and costly maintenance operations.

It would also be advantageous to have an injection device of which a potential drop in performance can be monitored and, notably, anticipated.

It would finally be advantageous to have an injection device of simple design, that is easy to implement, to fit and to remove and which can be installed on an existing effluents treatment installation.

SUMMARY OF THE INVENTION

A first subject of the invention allowing this goal to be achieved is a device for injecting a secondary fluid into a main liquid, comprising:

a first part able to convey the secondary fluid in a substantially longitudinal direction;

a second part able to eject the secondary fluid from the device, so as to inject said secondary fluid into a main liquid, said second part being in fluidic connection with the first part and comprising an open end;

the device comprising at least a first position, referred to as the low position, and a second position, referred to as the high position, and further comprising a positioning means able to position the device in a position comprised between the first position and the second position.

The device according to the invention thus has at least two positions allowing the outlet section (or ejection section) for the secondary fluid to be modified. This significantly reduces the risk of a buildup of solids in the device and therefore reduces the risk of the device becoming clogged. It also reduces the risk of the device being abraded and aging.

According to the invention, an "injection device" is defined as being a device able to inject a fluid into another fluid, which is the main liquid.

According to one particular embodiment, the device also has a diffusion function and may be referred to as a "diffuser", notably a radial diffuser.

The secondary fluid may be a liquid, a gas, a mixture of liquid or gas with a solid, a liquid-gas mixture or any liquid-gas-solid combination.

According to the invention, the terms "upstream" and "downstream", "inlet" and "outlet", or "below" and "above" are defined in relation to the main flow direction of the secondary fluid in the device.

According to the invention, the "longitudinal" direction (represented by the direction "Z") is also defined as being the main flow direction of the secondary fluid in the device.

"Transverse" is therefore defined as being perpendicular to the longitudinal direction, and a "radial" direction is also defined as being a direction that is radial in a transverse plane.

The longitudinal direction may be the vertical direction. In that case, the device is used vertically and the secondary fluid may then flow from the top down.

Alternatively, the longitudinal direction may be at a non-zero angle with respect to the vertical direction.

The "first position" or "low position" is defined as being the device configuration in which the outlet section for the secondary fluid is at a minimum.

The "outlet section" for the secondary fluid is defined as being the sum of all the available openings at the open end of the second part of the device, that allow the secondary fluid to be ejected.

"Minimum" means the smallest opening, and therefore the smallest outlet section for the secondary fluid that the device provides. This minimum outlet section corresponds to the low position of said device.

The "second position" or "high position", is defined as being the device configuration in which the outlet section for the secondary fluid of the device is at a maximum.

"Maximum" means the largest opening and therefore the largest outlet section for the secondary fluid that the device provides. This maximum outlet section corresponds to the high position of said device.

The device may be positioned in the first or in the second position, or in at least one intermediate position in which the outlet section for the secondary fluid is greater than the minimum outlet section and less than the maximum outlet section.

According to the invention, it must be understood that the position comprised between the first position ($Z_1$) and the second position ($Z_2$) includes said first and second positions.

The first and the second part may be made as a single piece, or as two, or even as more than two, pieces.

According to one embodiment, the positioning means comprises a means able to move the first part longitudinally.

According to an alternative embodiment, the positioning means comprises a means able to move the second part longitudinally.

According to another alternative embodiment, the positioning means comprises a means able to move both the first and the second part longitudinally.

According to one embodiment, the first and second positions are defined with respect to a distance between the open end of the second part and a reference surface situated in a transverse plane, a minimum distance corresponding to the first position and a maximum distance corresponding to the second position.

According to the invention, the term "distance" between the open end of the second part and a reference surface is defined as being the shortest distance between these in the longitudinal direction.

According to one particular embodiment, the maximum distance is comprised between 3 and 6 cm. That allows the device to be cleaned while still maintaining enough secondary-fluid injection pressure that said fluid can be injected into the main liquid sufficiently effectively.

According to one embodiment, the second part is configured in such a way as to apply to the secondary fluid a deflection that is transverse, essentially radial, to the longitudinal direction. That allows a radial injection device, particularly a radial diffusion device.

According to one advantageous embodiment, the second part has a conical shape widening at its open end.

According to one particular embodiment, the open end of the second part has a first undulating profile in the form of a series of peaks and troughs oriented substantially in the longitudinal direction.

Such an undulating profile, in a simple way, ensures a minimum passage section for the ejection of the secondary fluid, whether the injection device is in the high position or in the low position, while at the same time advantageously dispensing with the bolts and spacers fixing of the diffusion devices of the prior art. This avoids zones in which solids can become caught and/or zones in which solids can accumulate.

In particular, the first undulating profile may be a substantially sinusoidal profile defined by a first period and a first amplitude. The peak-to-peak amplitude of the sinusoidal profile corresponds to the difference in height between a peak and a trough that are adjacent, and is equal to twice the amplitude.

The advantage of a sinusoidal profile is its ease of use and of manufacture. Another advantage is that it avoids a risk of additional depositing of solid particles.

According to one embodiment, the device further comprises a base having a first surface forming the reference surface and situated facing the second part.

The open end of the second part may be configured in such a way as to have at least one point of contact with the base when the device is in the first position, while still allowing the secondary fluid out.

According to one particular embodiment, the first surface of the base has a second undulating profile in the form of a series of peaks and troughs oriented substantially in the longitudinal direction.

The device may comprise:
  an undulating profile only on the first surface of the base, or
  an undulating profile only on the open end of the second part of the device, or
  an undulating profile both on the first surface of the base and on the open end of the second part of the device.

Advantageously, the second undulating profile may be configured to collaborate with the first undulating profile in such a way as to position the second part with respect to the base and to block transverse movements of said second part with respect to said base. This allows the positioning of the second part to be improved and the potential lateral movements of said second part with respect to the base to be limited thus notably limiting the impact of any potential vibrations of the injection device.

In particular, the second undulating profile may be a substantially sinusoidal profile defined by a second period and a second amplitude, the second period being substantially equal to the first period (of the first undulating profile) and the second amplitude being less than the first amplitude (of the first undulating profile).

According to one embodiment, the base comprises a centering means situated facing the second part. Said centering means may also act as a deflector for the secondary fluid, so as to force said secondary fluid to follow a radial path.

According to one embodiment, the device further comprises a support situated below the base so that said base is situated between the support and the second part.

According to one embodiment, the device further comprises a flexible part that is flexible in the longitudinal direction. Said flexible part may be situated at one or other of the first and second parts or between the first and the second part. Such a flexible part facilitates the longitudinal movement of the device, notably its movement between the low position and the high position and vice versa.

According to one embodiment, the first part and the second part form a single piece.

According to an alternative embodiment, the first part and the second part are formed by two pieces connected together in a fluidtight manner. The connecting means may be a flexible part.

According to one embodiment, the device further comprises a measurement means for measuring the pressure inside said device.

A second subject matter of the invention is a method for cleaning an injection device, comprising the following steps:
  a first step of positioning the device in a third position situated above the first position and below or even with the second position;
  a second step of maintaining the third position for a given duration;
  a third step of positioning the device in a fourth position situated below the third position and above or even with the first position;
  the fluid being injected continuously into the device throughout at least all of said steps.

The third position may be the second position or high position, or may be an intermediate position lower than the second position and higher than the first position or the fourth position.

The fourth position may be the first position or low position, or may be an intermediate position higher than the first position and lower than the second position or the third position.

According to one embodiment, the injection device comprises a measurement means for measuring the pressure, the positioning first step is initiated when the measured pressure exceeds a maximum pressure threshold, and the maintaining second step is carried out until a minimum pressure threshold is reached.

A third subject matter of the invention is an effluent treatment installation comprising an injection device according to the first subject matter of the invention.

According to one particular embodiment, the effluent treatment installation comprises a treatment reactor or tank of which a surface may form the reference surface of an injection device.

BRIEF DESCRIPTION OF THE DRAWINGS

Further features and advantages of the invention will become apparent from the following description given by way of nonlimiting illustration with reference to the attached figures among which:

FIG. 1 comprises two figures FIG. 1A and FIG. 1B illustrating a radial diffuser of the prior art;

FIG. 5 comprises four figures FIG. 5A, FIG. 5B, FIG. 5C, FIG. 5D illustrating the example of the device of FIG. 3 in the two, low and high, positions;

DETAILED DESCRIPTION

FIGS. 1A and 1B have already been described in the "Prior art" section of the present description.

FIGS. 2 to 5D illustrate an example of an injection device.

Figure 2:
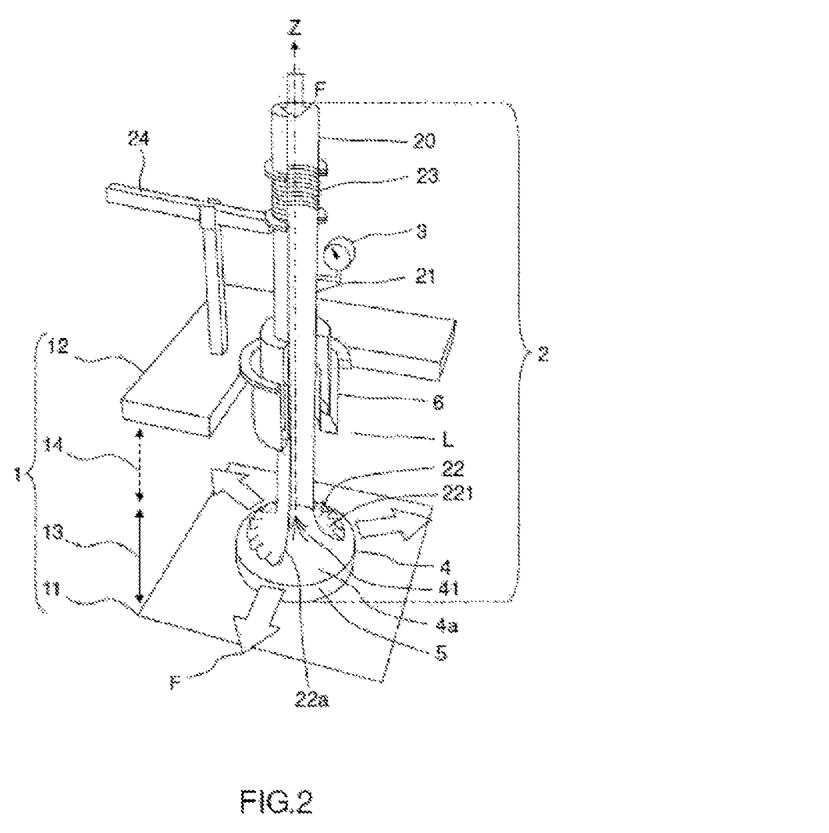
FIG. 2 illustrates an example of an injection device according to the invention.

The injection device 2 is designed to be incorporated into a reactor 1 comprising a floor 11, a roof 12 and walls (the walls are not depicted). The reactor further contains a head 13 of main liquid L and a gas ceiling 14 above said main liquid. As an alternative to a reactor, this may be a tank.

Alternatively, the injection device may be situated upstream of a reactor or of a tank.

The injection device comprises a first part 21 able to convey the secondary fluid F in a substantially longitudinal direction Z. In the example depicted, the first part 21 is part of a pipe tube 20.

The pipe tube 20 may be connected at its upper end (the end not immersed in the main liquid L) to a pressure measuring device 3, for example, although not exclusively, a manometer.

Furthermore, the first part 21 may comprise a flexible portion 23 that is flexible in the longitudinal direction Z. Said flexible portion may be a bellows, notably a metal bellows.

The flexible portion 23 depicted is connected to a positioning means 24 which, when actuated, is able to act on the length of said flexible portion, allowing the injection device to be moved by a few centimeters along the longitudinal axis Z. The positioning means is described later on, in connection with FIGS. 5A to 5D.

The second part 22 able to eject the secondary fluid F forms just one piece with the first part 21. In other words, the tube 20 is a single piece comprising a first part able to convey the secondary fluid F and a second part able to eject said secondary fluid.

According to the example depicted, the second part is a cone or "ejection cone" 22, said cone being able to be immersed in the main liquid L. In other words, the pipe tube 20 ends in a conical shape. Such a conical shape allows the secondary fluid to be deflected notably so as to force it to exit radially. As an alternative to a conical shape, any other flared shape able to impart a radial direction on the secondary fluid as it exits the tube may be envisioned, such as, for example, a pyramid shape, an ellipsoidal shape, etc.

According to the example depicted, the ejection cone 22 ends with a first undulating profile 221 in the form of a series of peaks 221a and of troughs 221b oriented substantially in the longitudinal direction Z.

Figure 3:
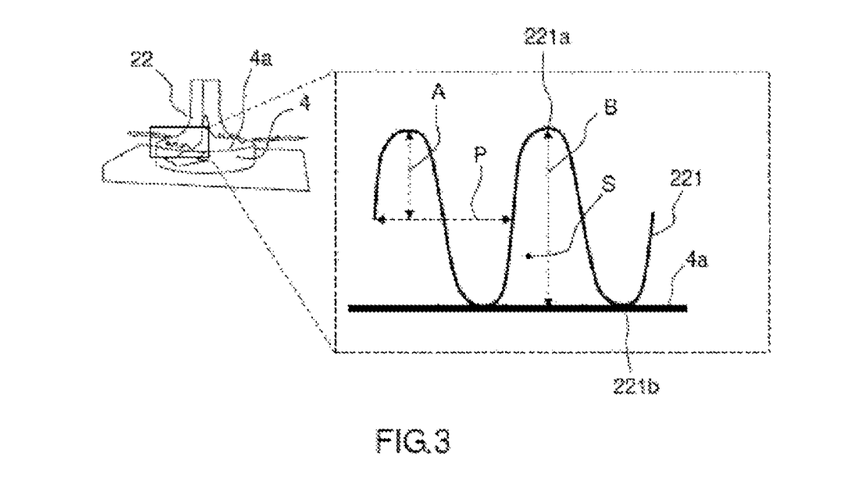
FIG. 3 illustrates a detail of the example of the injection device of FIG. 2.

One example of a first undulating profile 221 is illustrated in greater detail in FIG. 3. The ejection cone ends with a sinusoidal first undulating profile. The sinusoidal first profile is defined by a first period P and an amplitude A. The peak-to-peak amplitude B, which is the amplitude between a peak 221a and a trough 221b which are adjacent, is equal to twice the amplitude A. The minimum ejection section $S_{min}$ for the ejection of the secondary fluid F (corresponding to the ejection section when the device is in the low position) is equal to the sum of N areas delimited by the sinusoidal curve (profile of the cone) connecting two adjacent troughs and by the straight line connecting said adjacent troughs, N being the number of troughs (or of peaks).

A sinusoidal first undulating profile may for example be defined:
 by a D/N ratio comprised between 10 and 100, preferably between 20 and 70; D being the outside diameter of the cone (in millimeters),
 by a peak-to-peak amplitude B comprised between 2 and 20 mm, preferably between 2 and 10 mm.

As an alternative to a profile of sinusoidal type, the profile may be triangular, square or any other suitable shape. However, the advantage of a sinusoidal profile is its ease of use and of manufacture. Another advantage is that it avoids a risk of additional depositing of solid particles in the device.

According to the example depicted, the ejection cone 22 is situated facing a base 4, illustrated in the form of a plate.

The plate depicted comprises on its first surface 4a, or surface facing the ejection cone, a projection 41 of frustoconical shape. Said projection 41 is oriented along the longitudinal axis Z and is directed toward the inside of the ejection cone 22. That allows said ejection cone to be centered and held in place on the longitudinal axis Z, without the need to add a specific fixing and/or retaining and/or centering means to the device.

When the ejection cone is in contact with the plate 4, only the trough parts 221b of the undulating profile 221 are in contact with said plate. In that case, the total section for outlet of the secondary fluid F corresponds to the minimum ejection section $S_{min}$ for the ejection of said secondary fluid, namely to the sum of the N areas delimited by the sinusoidal curve (undulating profile of the cone) connecting two adjacent troughs and by the straight line (profile of the plate) connecting said adjacent troughs.

The plate 4 may advantageously be fixed to a support 5, for example a block. Said support may be positioned on the floor 11 of the reactor 1, so as to raise the secondary fluid F up off said floor. That notably limits the abrading of said floor over the course of time.

The plate 4 is preferably, but not exclusively, made of steel. The support 5 is preferably, but not exclusively, made of concrete.

If the reactor needs to be fluidtight and the gaseous ceiling needs to be contained, then a sealing means 6, for example a seal, may be situated between the tube 20 and the roof 12 of the reactor. As a preference, the seal is a hydraulic seal. As a preference, the seal is configured to provide sealing between the injection device and the reactor under low pressure (typically of the order of 0.02 to 0.03 bar, for example, although not exclusively) while allowing the injection device some mobility along the longitudinal axis. The seal thus prevents gas from escaping into the atmosphere.

Figure 4:
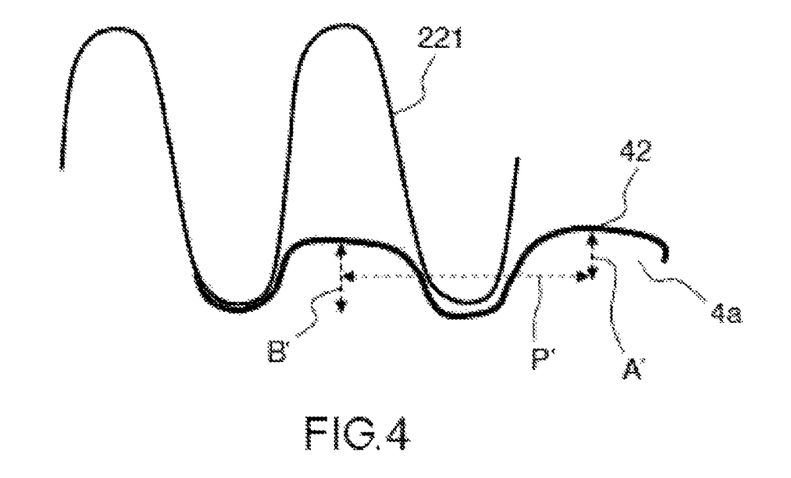
FIG. 4 illustrates a variant of the example of FIG. 3.

FIG. 4 depicts a variant form of plate 4 comprising, on its first surface 4a (the surface facing the ejection cone 22), a second undulating profile 42 of substantially sinusoidal type of which the second period P' is substantially equal to the first period P (period of the undulating profile of the ejection cone) and of which the amplitude A' is less than the first amplitude A (amplitude of the undulating profile of the ejection cone).

That allows improved positioning of the ejection cone and limits the potential lateral movements of said cone with respect to the plate and also notably limits the impact of any potential vibrations of the injection device. It also allows a projection 41 to be dispensed with.

In that case, the minimum ejection section $S'_{min}$ for the ejection of the secondary fluid (and which corresponds to the ejection section when the device is in the low position) is equal to the sum of the N areas delimited by the sinusoidal curve (undulating profile of the cone) connecting two adjacent troughs and by the substantially sinusoidal curve (undulating profile of the plate) connecting said adjacent troughs. The surface area $S'_{min}$ is less than the surface area $S_{min}$.

The undulating peripheral profile of the ejection cone in a simple way ensures a minimum passage section $S_{min}$ or $S'_{min}$ for the ejection of the secondary fluid, whether the injection device is in the high position or in the low position, while at the same time advantageously dispensing with the bolts and spacers fixing of the diffusion devices of the prior art. That avoids zones in which solids, for example fibrous waste, can become caught and/or zones in which such solids can accumulate.

Furthermore, the device of the invention comprises means to allow the ejection cone to move along the longitudinal axis relative to the base. That allows the distance between the ejection cone and the base to be modified, and this has the effect of modifying the passage section for the secondary fluid.

As a preference, the ejection cone may move away from the base by a distance varying between 3 cm and 6 cm, so as to allow the device to be cleaned while at the same time maintaining sufficient secondary-fluid injection pressure for said fluid to be able to be injected into the main liquid sufficiently effectively.

Figure 5A:
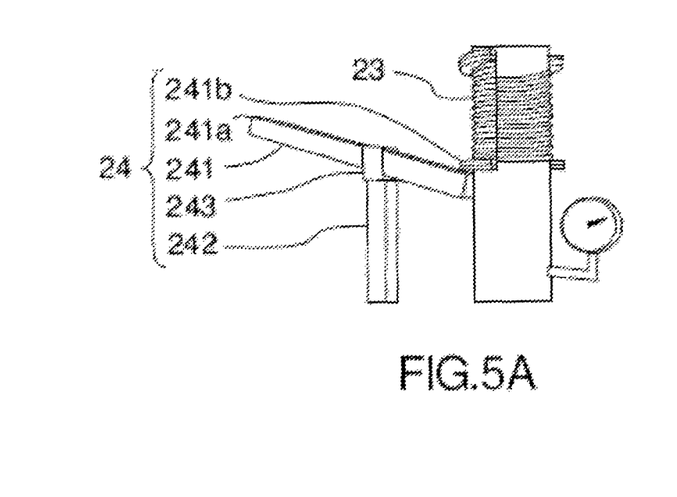
Figure 5B:
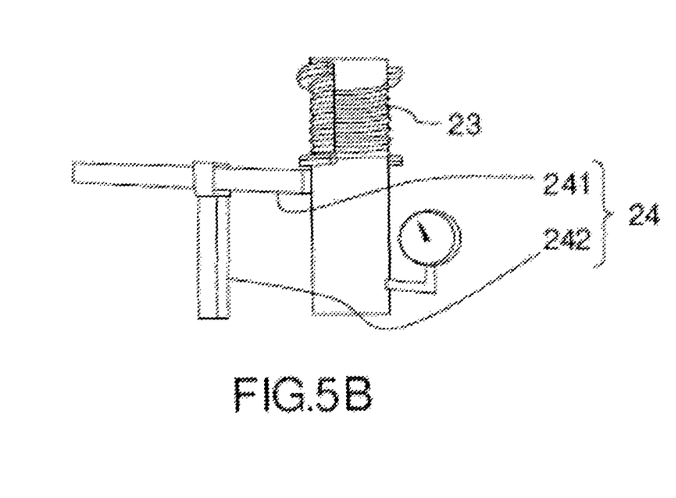
Figure 5C:
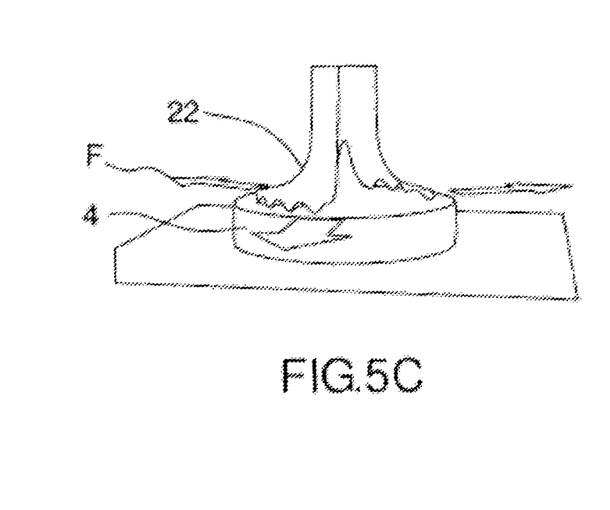
Figure 5D:
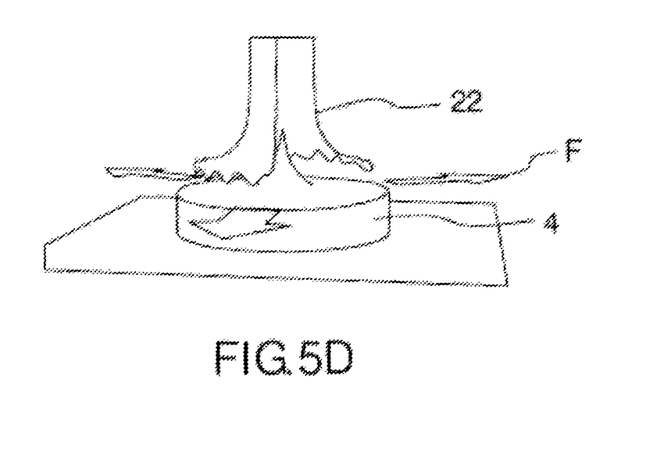

FIGS. 5A to 5D illustrate two positions of the injection device. FIGS. 5A and 5B illustrate the positioning means (FIG. 5A) and the positioning of the ejection cone (FIG. 5B) in the low position or the position referred to as the "planted" position, which is a nominal position of the device in operation. FIGS. 5C and 5D illustrate the positioning means (FIG. 5C) and the positioning of the ejection cone (FIG. 5D) in the high position or the position referred to as the "raised" position, which is a position for cleaning (or unclogging) the device.

The positioning means 24 is configured to act on the flexible portion 23 of the tube, so that the ejection cone 22 can be raised or lowered without the need to stop the circulation of the secondary fluid in the device and the ejection of said fluid into the main liquid. Thus, uninterrupted circulation of the secondary fluid enables the injection device to be cleaned, and allows the velocity at which said fluid is ejected not to be reduced dramatically (or even reduced to nothing as may occur in the event of clogging). This in particular means that the sludge and fibrous waste that may accumulate in the device, notably in the injection cone, can be eliminated, thus avoiding clogging.

The positioning means 24 depicted is a system of lever type which comprises a fixed bar 242 extending substantially in the longitudinal direction and connected to the roof 12 of the reactor, and a lever arm 241 connected to said fixed bar at a pivot point 243 and to the flexible portion 23 at a first end 241a. To raise the device, all that is required is for the lever arm 241 to be actuated by pressing down on the second end 241b of said arm. That allows the flexible portion 23 to be compressed so as to raise the pipe tube 20 and therefore the ejection cone 22. The longitudinal movement of the cone corresponds to the compression of the flexible portion.

The longitudinal movement of the device of the invention is therefore very easy to achieve. As a result, the cleaning operations are very easy to perform, and can be carried out without interrupting the effluent treatment operations. This can be done automatically, for example by connecting the second end of the lever arm to a programmed controller.

As an alternative to this system, another system of lever type may be envisioned or else another positioning means performing the same function, for example a magnetic system or a motorized (electrically, pneumatically, etc. motorized), or else simply a manual, system.

The positioning means may act on the first part or on the second part of the injection device or on both parts at once.

According to one embodiment, a method for cleaning the injection device may be initiated (manually and/or automatically) at regular intervals, notably as a preventive measure. For example, provision may be made for a cleaning method to be performed each day of use of the device, or weekly. The frequency of cleaning may be adapted to suit the parameters of use of the device and/or the quality of the effluents being treated.

According to an alternative or complementary embodiment, a method for cleaning the injection device may be initiated (manually and/or automatically) as a curative measure.

Whether performed as a preventive measure or as a curative measure, a cleaning method may be initiated as a function of the pressure in said injection device, for example when the pressure measured in said device is above a maximum pressure threshold defined by the operator. In that case, the injection device comprises a pressure measuring means, for example, although not exclusively, a manometer.

The injection device of the invention can be used for the treatment of effluents, typically in a treatment reactor or tank, more generally in any effluent treatment installation. The injection device may also be used outside, for example upstream of a reactor or of a tank.

The injection device may be used:
  for dissolving and/or diffusing a gas (secondary fluid) into a main liquid, and/or mixing a liquid (secondary fluid) into a main liquid, and/or dissolving and/or diffusing a gas/liquid mixture (secondary fluid) into a main liquid.

Furthermore, the secondary fluid may be laden with solid particles.

The gas may be air, oxygen, ozonized or chlorinated gases, for example chlorine, chlorine dioxide or else ozone, etc.

The main liquid may be an effluent that is to be treated, for example an aqueous effluent.

The secondary fluid may comprise a mixed liquor of biological sludge.

Figure 6:
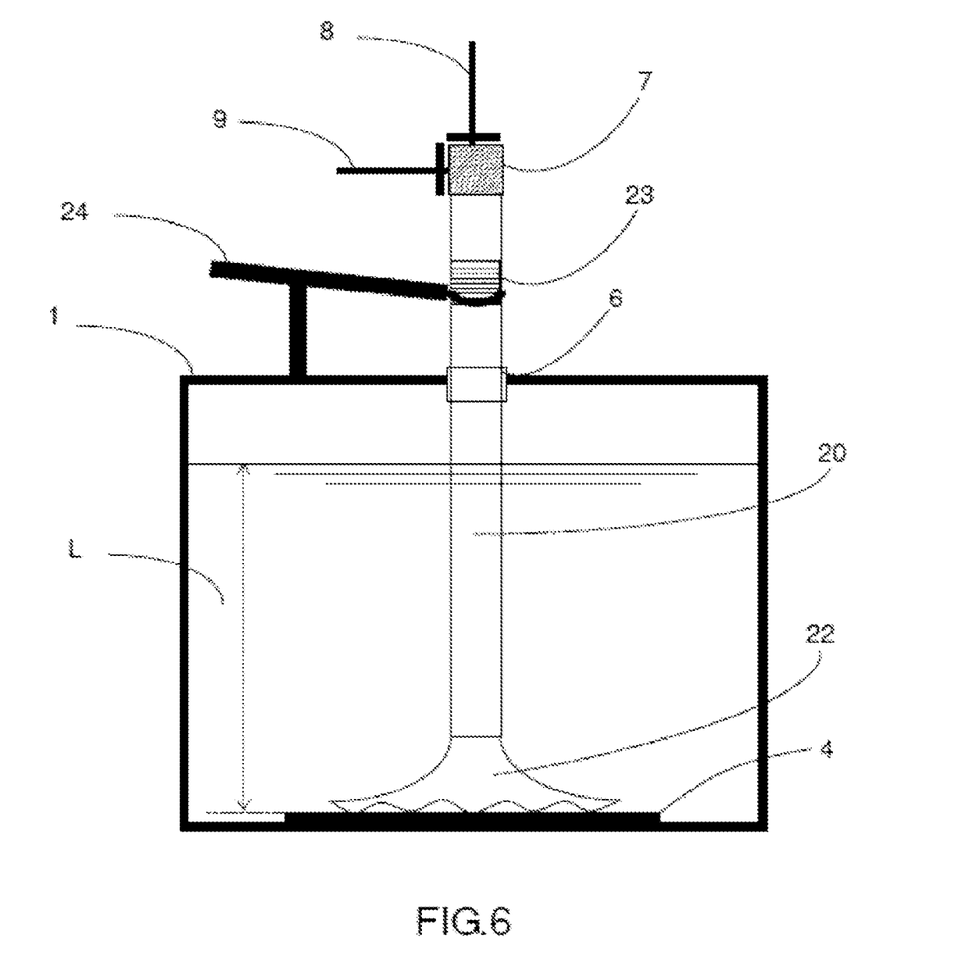
FIG. 6 illustrates an example of the use of the injection device according to the invention.

FIG. 6 illustrates an example of a use of the injection device comprising a tube 20 and a cone 22 at the end of the tube and which allows an ozonized gas to be dissolved by diffusion into a biological mixed liquor by way of functional liquid, the mixed-liquor/gas mixture being the secondary fluid which is then mixed with the effluent that is to be treated (main liquid L) at the outlet of the device for injection into the reactor 1. The injection device rests on a base 4 at the bottom of the reactor.

The injection device comprises a mixer 7 connected to a functional-liquid inlet 8 and to a gas inlet 9.

The gas flow rate is, for example, 25 kg $O_2/O_3 \cdot h^{-1}$ and the liquor flow rate is, for example, 25 m3/h. The secondary fluid thus exhibits a gas:mixed-liquor ratio of 1 kg gas/m³ liquid.

The biological mixed liquor may be characterized by:
an SM concentration comprised between 1 and 15 g/L, for example of 3.1 g/L; and/or
a volatile material content comprised between 50 and 95%, for example 77%; and/or
a fibrous waste concentration in excess of 20 mg/L, for example 138 mg/L, and/or
the presence of sand, notably microsand, for example microsand of which 90% has a particle size of below 0.2 mm.

Thus, the functional fluid may be particularly concentrated in solid matter, have a clogging capability and may also have a degree of abrasiveness.

By way of nonlimiting illustration, the device illustrated in FIG. 6 may notably have the following features:
The length of the pipe tube 20 is 5 m and its inside diameter is 100 mm (DN 100).
The tube is immersed in a reactor under 4.5 meters of main liquid L and a gas ceiling of 50 cm.
The diameter D of the ejection cone 22 is 25 cm.
The number of peaks (or number of undulations) N of the profile of the cone is 8.
The ratio D (mm) to N is thus 31.25.
The peak-to-peak amplitude B is 2.5 mm.
The base 4 has a flat profile.

This configuration of the cone yields a passage section of $9.8 \times 10^{-4}$ m² and an ejection velocity of 9.6 m/s when the device is in the low position.

It is evident from all of the foregoing that the injection device according to the invention can be used with mediums laden with solid matter (sludge, suspended matter, fibrous waste, etc.), such as typically a biological mixed liquor. For example, the suspended matter concentration may be in excess of 1 g/L. The injection device according to the invention may also be used in mediums laden with abrasive matter such as sand and/or silt.

The injection device also offers the following advantages:
ease of manufacture (absence of welds which are difficult to perform and therefore potentially more sensitive to corrosion);
ease of installation in an existing reactor or tank;
ease of fitting and of removal (no bolts or spacers);
ease of use;
robustness, notably with the technical and energy performance of the device being maintained;
significant reduction in the risk of an accumulation of solids (sludge, fibrous waste, etc.) in the device and therefore a reduction in the risk of the device becoming clogged;
reduction in the risk of abrasion and of aging of the device;
the capacity to carry out maintenance operations (cleaning, unclogging, etc.):
without interrupting the operation of the device, of the reactor or of the tank and more widely of the treatment installation,
manually or automatically,
as a curative and/or preventive measure.

The invention claimed is:

1. A device for injecting a secondary fluid (F) into a main liquid (L), comprising:
a first part able to convey the secondary fluid (F) in a substantially longitudinal direction (Z);
a second part able to eject the secondary fluid (F) from the device, so as to inject said secondary fluid into a main liquid (L), said second part being in fluidic connection with the first part and comprising an open end;
the device comprising at least a first position, referred to as the low position, and a second position, referred to as the high position, and further comprising a positioning means able to position the device in a position comprised between the first position and the second position, the first and second positions being defined with respect to a distance between the open end of the second part and a reference surface situated in a transverse plane, a minimum distance corresponding to the first position and a maximum distance corresponding to the second position, further comprising a base having a first surface forming the reference surface and situated facing the second part,
the open end of the second part being configured in such a way as to have at least one point of contact with the base when the device is in the first position (Z1), while still allowing the secondary fluid (F) out.

2. The device as claimed in claim 1, the second part being configured in such a way as to apply to the secondary fluid (F) a deflection that is transverse, to the longitudinal direction (Z).

3. The device as claimed in claim 2, the second part having a conical shape widening at its open end.

4. The device as claimed in claim 3, the open end of the second part having a first undulating profile in the form of a series of peaks and troughs oriented substantially in the longitudinal direction.

5. The device as claimed in claim 4, the first undulating profile being a substantially sinusoidal profile defined by a first period and a first amplitude (A).

6. The device as claimed in claim 1, the device comprising a flexible part that is flexible in the longitudinal direction (Z).

7. The device as claimed in claim 1, the first part and the second part forming a single piece.

8. The device as claimed in claim 1, the first part and the second part being formed by two pieces connected together in a fluidtight manner.

9. The device as claimed in claim 1, further comprising a measurement means for measuring the pressure inside said device.

10. The device as claimed in claim 1, the base comprising a centering means for centering the second part and situated facing said second part.

11. The device as claimed in claim 1, further comprising a support situated below the base so that said base is situated between the support and the second part.

12. A device for injecting a secondary fluid (F) into a main liquid (L), comprising:
   a first part able to convey the secondary fluid (F) in a substantially longitudinal direction (Z);
   a second part able to eject the secondary fluid (F) from the device, so as to inject said secondary fluid into a main liquid (L), said second part being in fluidic connection with the first part and comprising an open end;
   the device comprising at least a first position, referred to as the low position, and a second position, referred to as the high position, and further comprising a positioning means able to position the device in a position comprised between the first position and the second position, the first and second positions being defined with respect to a distance between the open end of the second part and a reference surface situated in a transverse plane, a minimum distance corresponding to the first position and a maximum distance corresponding to the second position, further comprising a base having a first surface forming the reference surface and situated facing the second part, the first surface of the base having a second undulating profile in the form of a series of peaks and troughs oriented substantially in the longitudinal direction.

13. The device as claimed in claim 12, the open end of the second part having a first undulating profile in the form of a series of peaks and troughs oriented substantially in the longitudinal direction, the second undulating profile being configured to collaborate with the first undulating profile in such a way as to position the second part with respect to the base and to block transverse movements of said second part with respect to said base.

14. The device as claimed in claim 12, the first undulating profile being a substantially sinusoidal profile defined by a first period and a first amplitude (A), the second undulating profile being a substantially sinusoidal profile defined by a second period and a second amplitude (A'), the second period being substantially equal to the first period and the second amplitude (A') being less than the first amplitude (A).

* * * * *